March 24, 1942.   R. E. UTTER   2,277,618
ENCLOSURE
Filed June 25, 1938
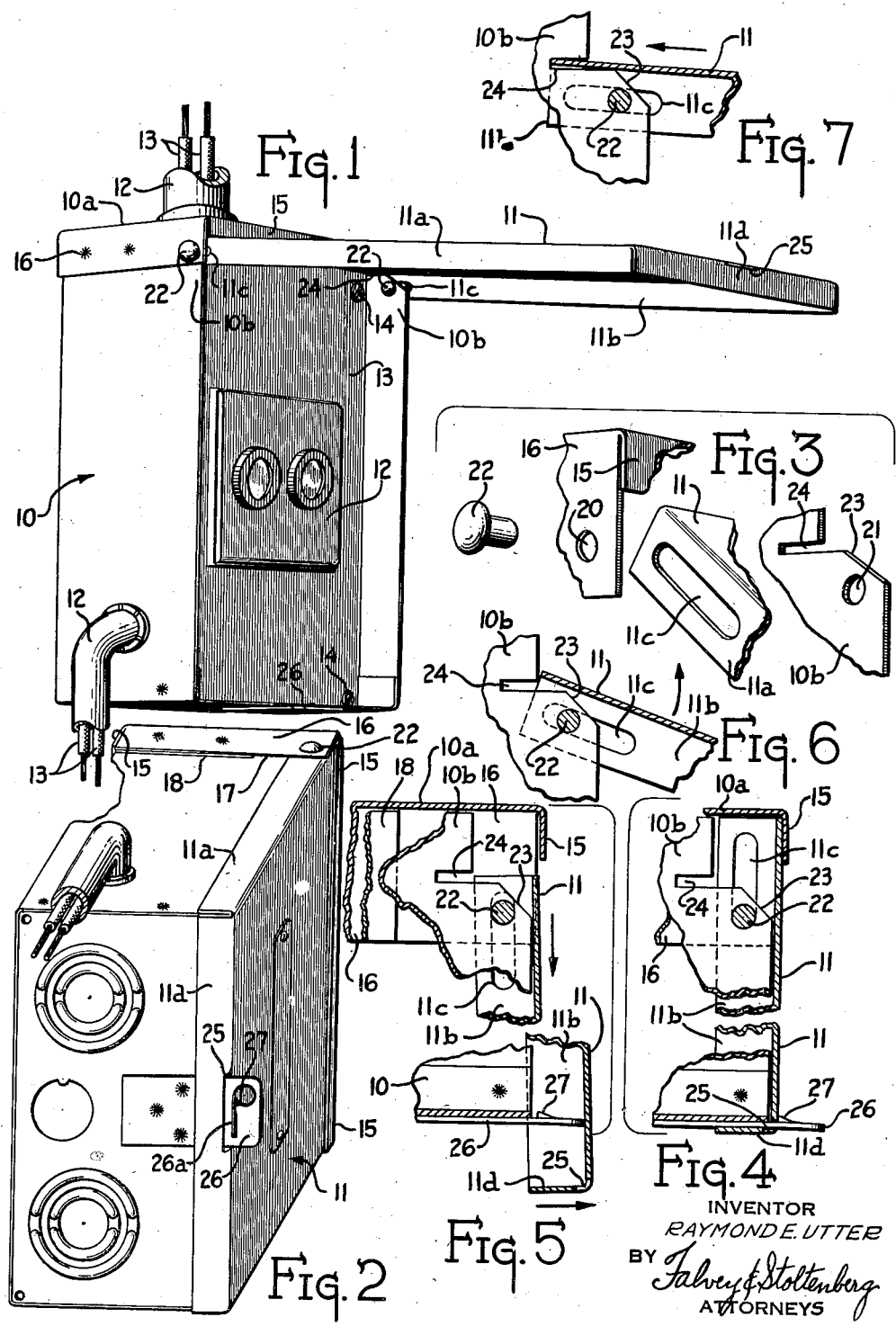
INVENTOR
RAYMOND E. UTTER
BY Falvey & Stoltenberg
ATTORNEYS Patented Mar. 24, 1942

2,277,618

UNITED STATES PATENT OFFICE 2,277,618

ENCLOSURE

Raymond E. Utter, Cincinnati, Ohio

Application June 25, 1938, Serial No. 215,767

3 Claims. (Cl. 220—38)

This invention relates to enclosures, more particularly to enclosures for electrical equipment suitable for use in protecting electrical distribution systems, in which a removable cover is supplied to make the electrical equipment available for manipulation or adjustment.

In the past, enclosures have been provided with hinges of single types adapted to make covers readily removable to manipulate electrical equipment positioned on the inside of the enclosures. With enclosures of this type much annoyance has been occasioned and often actual injury suffered by an operator who had opened the cover without making secure provision for preventing the cover from closing while he was making changes to the electrical equipment. The cover not being securely held open was frequently closed accidentally by an uncontrolled agency such as wind etc. and would give the operator's hands or fingers a violent blow which often caused injury. The present invention contemplates the provision of an enclosure with a hinged cover which may be readily opened and which is provided with a novel mechanism for securely holding the cover in open position which will obviate the difficulties pointed out above.

This invention further contemplates the provision of an enclosure which is weather-proof to protect the electrical apparatus mounted within the enclosure.

It is, therefore, a principal object of this invention to provide an enclosure, particularly for electrical apparatus, in which the cover is adapted to be securely held in open position.

It is a further object of this invention to provide a hinge cooperating with securing means for the removable cover of an enclosure which is adapted to hold the cover securely in place in both open and closed positions.

It is a further object of this invention to provide a hinge for the cover of an enclosure which cooperates with the structural elements of the enclosure to provide a weather-proof joint between the cover and the enclosure.

It is a further object of this invention to provide a hinge for the cover of an enclosure which is fabricated from stamped sheet metal parts and rivets in which the sheet metal parts are formed with only simple right-angle bands.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is a perspective view of an enclosure to which the invention has been applied.

Figure 2 is another perspective view of the same enclosure.

Figure 3 is an exploded view showing the details of the hinge construction.

Figure 4 is an elevational view, partly in section, showing the cover in closed position.

Figure 5 is an elevational view, partly in section, showing the cover in partly open position.

Figure 6 is an elevational view showing a relation of the moving parts.

Figure 7 is an elevational view showing a relation of the parts when the cover is in open position.

Referring to the drawing, particularly to Figure 1, a structure is disclosed to which the invention has been applied in which a box-like construction or enclosure 10 is provided which has a cooperating detachable cover 11 preferably hinged to the enclosure 10 adjacent its upper end. Conduits 12 are provided to enter the enclosure and lead electrical conductors 13 which cooperate with extraneous electrical circuits to control apparatus 12 such as fuses, switches etc., particularly such apparatus which requires the free use of both hands of an operator to manipulate them. The apparatus 12 may be supported in the enclosure 10 in the well known manner and may be provided with a flashing plate 13 which is held in position by means of screws 14. In order to manipulate the electrical apparatus 12, it is necessary to have the cover in open position substantially as shown in Figure 1.

To hold the cover 11 of the enclosure 10 in open position, which may be a substantially horizontal position, a novel hinged construction has been provided which acts between the enclosure and the cover preferably adjacent the upper end of the enclosure; this also allows the cover 11 to be in substantial vertical position when closed. The box-like construction or enclosure 10 is preferably fabricated with three sides and a bottom in the well known manner. The upper end is preferably left open and provided with a closure plate 10a whose edges are provided with pairs of parallel depending flanges 15 and 16 which enclose the open end of the box-like structure 10. The front and back flanges 15 are preferably fitted snugly to the sides of the enclosure 10 and are relatively shorter than flanges 16, while the side flanges 16 extend a short distance beyond the sides so as to provide a space 17 (Figure 2) into which is fitted a spacer 18 whose thickness is substantially the same as that of the sheet metal from which the cover 11 is fabricated. The plate 10a is preferably welded in position through the agency of the flanges at the sides and bottom of the enclosure 10, the spacer 18 being held in position in a similar manner.

A pair of aligning apertures 20 and 21 is provided in the flange 16 and the side 10b (Figure 3) on each side of the enclosure, through which a rivet 22 is adapted to extend, being peened over at its inner end as shown in Figure 1. The cover 11 is provided with side flanges 11a and 11b which are each provided at their upper ends with a slot 11c, the flanges 11a and 11b being adapted to fit in the spaces 17 formed by the spacer 18 between the depending flange 16 and the side 10b on each side of the enclosure. Adjacent the aligning apertures 20 and 21 on each side of the enclosure, the slots 11c, formed in the side flanges of the cover 11, are adapted to cooperate with the rivets 22 to form the hinged construction which allows angular rotation of the cover 11 about the rivet 22, and also allows limited lateral movement of the cover 11 as defined by the movement of the rivets 22 along the slots 11c, the purpose of which will be described hereinafter.

On each side of the enclosure adjacent the aperture 21 in the side member 10b, the metal plate forming the side member is provided with an oblique cut 23 to prevent interference with the cover 11 as it rotates about the rivets 22. The oblique cuts 23 lead the cover upon its rotation directly into slots 24 formed in the side members 10b. The slots 24 are located, having reference to the aperture 21, so that when the cover 11 cooperates with the slots as substantially shown in part in Figure 7, the cover will be substantially in a horizontal position as generally shown in Figure 1. The slots 24 are comparatively narrow, although slightly larger than the thickness of the sheet material from which the cover 11 is fabricated. This tolerance allows rotation to a limited extent on the part of the cover around the rivet 22. The sides 10b are cut away about the slots sufficiently to prevent interference with the cover as it swings about the rivets 22.

Referring to Figure 2, the lower end of the cover 11 is provided with a flange 11d which is provided with a slot 25 through which extends, when the cover 11 is in closed position, an outwardly extending tongue 26, preferably welded to the side of the enclosure 10. The tongue 26 is provided with a spring catch projection 27 which cooperates with the sides of the slot 25 to hold the cover firmly in position when closed. The tongue 26 is adapted to be released from the slot by being pressed outwardly, so that the projection 27 is freed.

The operation of the hinged construction is shown in the series of Figures 4, 5, 6 and 7 which show the different positions of the parts of the hinged construction while it is being operated. Referring to Figure 4, the cover is shown in closed position which, for convenience of description, will be designated the initiating point. When the cover is in this position, its lower end with the flange 11d, is in cooperative relation with the side of the box, so that the tongue 26 extends through slot 25. The latching projection 27 will thereby have an opportunity to engage the side of the slot to hold the cover in closed position. This is also clearly shown in Figure 2. Adjacent the upper end of the enclosure, the depending flange 15 is in close engagement with the upper end of the cover 11, while the slots 11c, formed in the flanges 11a and 11b, cooperate at their lower ends with the rivets 22. When the parts of the enclosure are in this relative position, a weather-proof envelope for electrical apparatus is formed, particularly when the enclosure is mounted in the position shown in Figure 1, in which the hinged construction is located adjacent the upper end. The depending flanges 15 and 16 form a weather-proof cap for the enclosure and cover.

In order to open the enclosure and to place the cover substantially to the position shown in Figure 1, the tongue 27 is pushed downwardly (Figure 1) so as to release the catch projection 27 from cooperation with the side of the slot 25. This allows the cover 11 to be rotated outwardly so as to free the tongue 26 from its engagement with slot 25. The cover 11 then may move downwardly on the rivets 22 which advance relatively along the slots 11c as shown in Figure 5, so that the cover 11 extends a slight distance beyond the bottom of the enclosure. At this time, the rivets 22 may be substantially in the upper portion of the slots 11c. The cover is then rotated by moving it upwardly as indicated in Figure 6 where the rivets 22 are still relatively adjacent the upper portion of the slots 11c. The upper end of the cover must clear the cut-away portions of the sides 10b of the enclosure as shown.

The movement of the cover 11 is continued upwardly until it is in substantial alignment with the axis of the slots 24 formed in the sides 10b of the enclosure, at which time the cover is pushed inwardly, to force the upper end of the cover into the slots 24 as substantially shown in Figure 7. When the relative position of the parts of the hinged construction indicated in Figure 7 is obtained, the cover will be substantially in the position shown in Figure 1. The cover is now in substantially a horizontal position to allow free access to the interior of the enclosure without danger of accidental closure. The cover in this position will be acted upon by gravity tending to rotate it about the rivet 22. The upper end of the cover 11 engages the upper side of the slot 24 which prevents this rotation of the cover and, sufficient friction being present between the parts, the cover may not be displaced from its horizontal or open position without pulling it outwardly from the enclosure to free the engaged end from the slot.

The cover is closed by reversing the procedure until the position shown substantially in Figure 4 is again obtained. The tongue 26 may be provided with an aperture 26a adapted to position sealing devices of many well known types, which may prevent unauthorized opening of the enclosure.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a box-like construction having two open sides; a permanently attached cover for one open side; a detachable cover for the other open side; the first cover having depending flanges cooperating with the side of the box-like construction and the other cover, being spaced from the sides to form spaces; flanges on the detachable cover adapted to cooperate with the spaces; slots in the flanges of the detachable cover; aligning apertures in the flanges of the first cover and the side members of the box-like construction; rivets cooperating with the aligning apertures and the slots to form a hinge for the detachable cover; slot means in the sides of the box-like construction adjacent the hinge to cooperate with a part of the detachable cover when the cover is moved along the slots in its flanges to form a securing means for the detachable cover when in open position; and catch means acting between the detachable cover and the box-like construction to hold the detachable cover in closed position.

2. In a sheet metal enclosure, a box construction having two open sides, a vertical cover member for one open side of the box construction, flanges on the cover member adapted to overlie the sides of the box construction when the cover member is in closed position, elongated slot means in the flanges adjacent the upper end of the cover member, means cooperating with the box construction and the slot to form a pivot for the cover member to allow the cover member to swing thereabout and to allow lateral movement of the cover member inwardly of the box construction, slot means in a relatively fixed portion adjacent the pivot means cooperating with the cover member at the terminus of its inward lateral movement to hold the cover member in open position at a predetermined angular relation with the box construction, a horizontal fixed cover member to close the second open side of the box construction, depending flanges on the fixed cover member adapted to overlie the flanges on the vertical cover member and to form a narrow passageway therefor with the sides of the box construction, and a frontal depending flange on the fixed cover member to cooperate with the vertical cover member when it is in closed position.

3. In a sheet metal enclosure of the class described, a box construction having two open sides, a movable cover member for one open side of the box construction having flanges adapted to overlie the sides of the box construction when the cover member is in closed position, elongated slot means in the flanges adjacent one end of the movable cover member, a fixed cover member for the second open side of the box construction having a frontal depending flange to cooperate with the movable cover member when the movable cover member is in closed position, depending flanges on the fixed cover member adapted to overlie the flanges on the movable cover member and to form a narrow passageway with the sides of the box construction, pivot means fixed in the passageways to cooperate with the elongated slots in the flanges of the movable cover member to form a pivot for the movable cover member to allow the movable cover member to swing from open to closed position and to allow relative lateral movement of the movable cover member in an inwardly direction with respect to the box construction, and catch means including a slot means in the box construction to cooperate with the movable cover member adjacent the pivot means adapted by the lateral movement of the movable cover member to engage a portion of the movable cover member to hold the movable cover member in a predetermined angular relation for the open position with reference to the box construction.

RAYMOND E. UTTER.